US012809993B2

(12) United States Patent
Abdulrahman et al.

(10) Patent No.: US 12,809,993 B2

(45) Date of Patent: Nov. 24, 2026

(54) DEEP LEARNING POWERED WORDLISTS FOR ENHANCED CYBERSECURITY ASSESSMENT OF COMPUTER SYSTEMS

(71) Applicant: SAUDI ARABIAN OIL COMPANY, Dhahran (SA)

(72) Inventors: Basil Najeeb Abdulrahman, Dhahran (SA); Lojen Abdulaziz Albjaad, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 45 days.

(21) Appl. No.: 19/039,687

(22) Filed: Jan. 28, 2025

(65) Prior Publication Data

US 2026/0220274 A1 Jul. 30, 2026

(51) Int. Cl.

*G06F 21/57* (2013.01)
*G06F 40/40* (2020.01)

(52) U.S. Cl.

CPC ............ *G06F 21/577* (2013.01); *G06F 40/40* (2020.01); *G06F 2221/034* (2013.01)

(58) Field of Classification Search

CPC ................................ G06F 21/577; G06F 40/40
See application file for complete search history.

(56) References Cited

U.S. PATENT DOCUMENTS

| | | | | |
|---|---|---|---|---|
| 11,601,463 | B2 * | 3/2023 | Thakur | H04L 63/1416 |
| 12,001,550 | B1 * | 6/2024 | Schindel | G06F 21/554 |
| 12,026,260 | B2 | 7/2024 | Zou et al. | |
| 12,423,520 | B2 * | 9/2025 | Shin | G06F 40/211 |
| 12,537,681 | B2 * | 1/2026 | Ju | H04L 9/3066 |
| 12,537,861 | B2 * | 1/2026 | Hu | H04L 63/205 |
| 12,554,620 | B2 * | 2/2026 | Stevens | G06F 11/0793 |
| 12,651,074 | B2 * | 6/2026 | Foulon | G06F 21/577 |
| 2018/0336471 | A1 | 11/2018 | Rezagholizadeh et al. | |

(Continued)

FOREIGN PATENT DOCUMENTS

| | | | |
|---|---|---|---|
| CN | 110781666 | A | 2/2020 |
| CN | 111046183 | A | 4/2020 |
| CN | 110678881 | B | 10/2023 |

OTHER PUBLICATIONS

Koroniotis, Nickolaos et al., "A Deep Learning-based Penetration Testing Framework for Vulnerability Identification in Internet of Things Environments"; 2021 IEEE 20th International Conference on Trust, Security and Privacy in Computing and Communications (TrustCom); pp. 887-894; 2021 (8 pages).

(Continued)

*Primary Examiner* — Viral S Lakhia

(74) *Attorney, Agent, or Firm* — Osha Bergman Watanabe & Burton LLP

(57) ABSTRACT

A method includes generating, by a wordlist generator processing a wordlist property, a wordlist comprising at least one generated word. The wordlist generator has been generated by training a generative adversarial network (GAN) to output generated words using a training set comprising target words, the GAN comprising a generator model and a discriminator model, wherein the generator model and the discriminator model are machine-learning models, and deriving the wordlist generator from the trained GAN. The method further includes performing, by a cybersecurity assessment system, a cybersecurity assessment of a computer system, using the wordlist.

17 Claims, 8 Drawing Sheets

(56) References Cited

U.S. PATENT DOCUMENTS

| | | | | |
|---|---|---|---|---|
| 2019/0089721 | A1 | 3/2019 | Pereira et al. | |
| 2020/0394186 | A1 | 12/2020 | Domeniconi et al. | |
| 2023/0205894 | A1* | 6/2023 | Salo | G06F 16/353 726/25 |
| 2023/0308465 | A1 | 9/2023 | Alroobaea et al. | |
| 2023/0336528 | A1 | 10/2023 | Szurdi et al. | |
| 2024/0037243 | A1 | 2/2024 | Sylvester et al. | |
| 2024/0330348 | A1* | 10/2024 | Zawadowskiy | G06F 16/334 |
| 2024/0362047 | A1* | 10/2024 | Spain | G06Q 10/0633 |
| 2025/0252095 | A1* | 8/2025 | Lichtenstein | G06F 16/2428 |
| 2025/0274466 | A1* | 8/2025 | Narayan | H04L 63/1425 |
| 2026/0080102 | A1* | 3/2026 | Störtz | G06F 21/64 |
| 2026/0095476 | A1* | 4/2026 | Iyer | H04L 63/1433 |
| 2026/0189589 | A1* | 7/2026 | Barrios | H04L 63/1433 |

OTHER PUBLICATIONS

Alsmadi, Izzat et al., "Adversarial Machine Learning in Text Processing: A Literature Survey"; IEEE Access; vol. 10; pp. 17043-17077; 2022 (35 pages).

Belenko, Viacheslav et al., "Evaluation of GAN Applicability for Intrusion Detection in Self-Organizing Networks of Cyber Physical Systems"; 2018 International Russian Automation Conference (RusAutoCon); pp. 1-7; 2018 (7 pages).

* cited by examiner

DEEP LEARNING POWERED WORDLISTS FOR ENHANCED CYBERSECURITY ASSESSMENT OF COMPUTER SYSTEMS

BACKGROUND

Cybersecurity may include the protection of an organization's data or/and infrastructure from both outside threats as well as threats originating within the organization. For example, individuals within an organization may compromise the data, cause denial of service, or initiate another sort of attack. Identifying these risks through penetration testing, as part of an overall risk management, is an important aspect to identifying an organization's cybersecurity state. Wordlists or dictionaries are vital in penetration testing and enable security analysts to conduct their tests on many different types of applications. Nevertheless, currently used wordlists are formed using primitive statistical methods. This leads to inaccurate and indeterministic results that cost time and resources. Accordingly, there exists a need to create a wordlist that provides a more controlled environment for penetration testing, allows organizations to benchmark their cybersecurity state against an international or customized standard or framework to identify how mature their cybersecurity state is, and can be used to determine compliance with recommended practices and identify areas of improvement.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein generally relate to a method. The method includes generating, by a wordlist generator processing a wordlist property, a wordlist comprising at least one generated word. The wordlist generator has been generated by training a generative adversarial network (GAN) to output generated words using a training set comprising target words. The GAN includes a generator model and a discriminator model, wherein the generator model and the discriminator model are machine-learning models. The method further includes deriving the wordlist generator from the trained GAN, and performing, by a cybersecurity assessment system, a cybersecurity assessment of a computer system, using the wordlist In one aspect, embodiments disclosed herein generally relate to a system. The system includes a wordlist generator configured to generate a wordlist upon processing a wordlist property. The wordlist includes at least one generated word. The wordlist generator has been generated by training a generative adversarial network (GAN) to output generated words using a training set comprising target words, and deriving the wordlist generator from the trained GAN. The GAN includes a generator model and a discriminator model, wherein the generator model and the discriminator model are machine-learning models. The system further includes a cybersecurity assessment system configured to perform a cybersecurity assessment of a computer system, using the wordlist.

In one aspect, embodiments disclosed herein generally relate to a method of generating a wordlist generator. The method includes obtaining target words and generating metadata describing the target words. The method further includes generating, based on the target words, features of the target words, and creating a training database comprising the target words, the metadata and the features. The method also includes training a generative adversarial network (GAN) to output words using the training database, the GAN comprising a generator model and a discriminator model, wherein the generator model and the discriminator model are machine-learning models. The method includes deriving the wordlist generator from the trained GAN.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
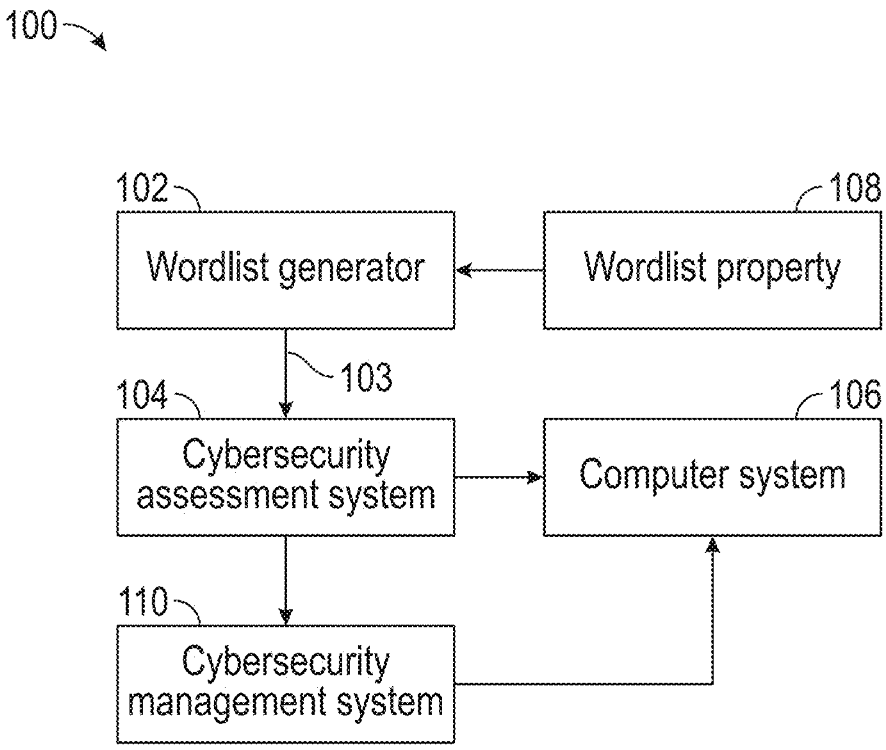
FIG. 1 a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. For example, an "a generated word," may include any number of "generated words" without limitation.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Although multiple dependent claims are not introduced, it would be apparent to one of ordinary skill that the subject matter of the dependent claims of one or more embodiments may be combined with other dependent claims.

In the following description of FIGS. 1-8, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

According to one or more embodiments, the present disclosure provides for methods and systems for assessing the cybersecurity of computer systems. A computer system can include computer software (such as applications), computer hardware (such as computer devices), or a combination of computer hardware or software. A computer system can include a computer network with wired or wirelessly connected computer hardware and/or computer software. A computer system can include resources, such as data, that should only be accessible to authorized users. To ensure that access to the resources is limited to authorized users, input of an admission text input by the user is required. The admission text input may be a password, user name, and/or directory name. The admission text input may be input into an input field of a user interface associated with the computer system. As an example embodiment for illustration purposes only, the user interface may be a computer application with at least one input field, where the user may input the admission text input into the input field using an input device, such as a keyboard, microphone etc. Examples of user interfaces may be a webpage, a file explorer, etc. If the admission text input provided by the user matches a stored admission text input associated with the computer system, then access to the resource may be granted. If the admission text input provided by the user does not match the stored admission text input associated with the computer system, then access to the resource may be denied.

Cybersecurity is the art of protecting computer systems and the data included in or associated with (e.g., accessible by) the computer systems (e.g., data stored in a memory or database) from unauthorized access, malicious attacks or criminal use. Cybersecurity thus refers to any technologies, practices and policies for preventing cyberattacks or mitigating their impact.

FIG. 1 illustrates a system 100 according to one or more embodiments. According to one or more embodiments, the system 100 is configured for assessing computer systems for potential vulnerabilities to cyberattacks. It is noted that the elements shown in FIG. 1 are abstractions and that, in practice, an element may not be unique or independent from other elements of the system. Further, the functionality of one or more elements may be shared between any number of elements. The system (100) of FIG. 1 performs a cybersecurity assessment of a computer system (106) using a wordlist generated by a wordlist generator (102).

The wordlist generator (102) is used to generate a wordlist (103) consisting of at least one word. A word in the wordlist may represent a word associated with a natural language, such as English, Spanish etc. Alternatively, in one or more embodiments, a word in the wordlist may not represent a word associated with a natural language, but instead may include a combination of text characters, including alphanumeric and other symbols, that can follow a format required by passwords, user names, domain names or activities associated with resources of computer systems. According to one or more embodiments, the word in the wordlist is a word of a formal language. A formal language consists of words whose letters are taken from an alphabet and the words are formed according to a set of rules referred to as a formal grammar.

The wordlist generator is a machine-learned model. The wordlist generator (102), and the data used to train it, is described in greater detail later in the instant disclosure. However, for now, it is stated that the wordlist generator (102) is configured to generate a wordlist (103) using one or more machine learning algorithms.

According to one or more embodiments, the wordlist generator (102) receives a wordlist property (108) from a user or another system. The wordlist property (108) describes at least one property of the words to be generated by the wordlist generator (102). According to one or more embodiments, the at least one property is one of a common use of a word, a word type (noun or verb), and a technology related to the word. According to one or more embodiments, the at least one property may additionally include a known word from a known (published) wordlist, from text strings grabbed from the application (web or mobile), and/or webpages received from queries made with keywords from the application.

According to one or more embodiments, using the wordlist property (102), the wordlist generator (102) generates at least one generated word to be included in the wordlist (103). The operation of the wordlist generator (102) in generating words for the wordlist (103) will be described in detail later in the instant disclosure.

According to one or more embodiments, the wordlist generator (102) may optionally combine words from known published wordlists with the generated words in creating the wordlist (103) Examples of known wordlists included wordlists that are published on, and accessible or downloadable from, websites such as seclists (see https://github.com/danielmiessler/SecLists).

In one or more embodiments, the wordlist (103) is provided to a cybersecurity assessment system (104). The cyber assessment system (104) is configured to perform a cybersecurity assessment of the computer system (106) using the wordlist (103).

According to one of more embodiments, the cybersecurity assessment may be a penetration test. Penetration testing is the practice of attacking an organization's computer systems in the same way a hacker would; however, without malicious intent. Penetration testing is used to identify security holes or weak points in the protection set in place so that a level of exposure to a cyberattack can be determined. Performance of penetration tests may be a requirement in a particular industry, such as healthcare or finance.

According to one of more embodiments, the penetration test assesses a computer system's vulnerability (or, conversely, a resilience) to a brute force attack, a directory enumeration, to password cracking, or to username guessing.

A brute force attack uses trial and error to crack or determine items or data objects such as passwords, login credentials, and encryption keys. It is a tactic for gaining unauthorized access to individual accounts and organizations' systems and networks.

Directory enumeration identifies files and directories that are accessible to unauthorized users and which may contain sensitive information, such as configuration files, database backups, and credentials.

The cybersecurity assessment system (104) is configured to utilize at least one word from the wordlist (103) to perform the cybersecurity assessment test of the computer system. According to one or more embodiments, performing the cybersecurity assessment test includes inputting a word from the wordlist into an input field of a user interface associated with the computer system, where the input field is configured to allow or deny access to a resource of the computer system. In other words, for example, the word from the wordlist (103) may be used as an input for a password, username, directory name, or hostname. According to one or more embodiments, based on the inputting of the word, it may be determined if the resource of the computer system is accessible.

The process of inputting a word from the wordlist into the input field and determining whether, by means of the input word, the resource of the computer system is accessible may be repeated for multiple words in the wordlist. According to one or more embodiments, not all the words in the wordlist (103) are used in the cybersecurity assessment.

The result of performing the cybersecurity assessment can indicate the vulnerability of the computer system (106) to a cyberattack. According to one or more embodiments, the cybersecurity assessment system (104) is further configured to determine a security level of the computer system (106) based on the cybersecurity assessment (i.e., classify or quantify the vulnerability of the computer system).

According to one or more embodiments, the security level of the computer system may be provided to a cybersecurity management system (110). The cybersecurity management system (110) may perform a cybersecurity task based on the security level. According to one or more embodiments, the cybersecurity task includes controlling user and password management related to the computer system, enabling or disabling protocols of the computer system, applying secure encryption algorithms to the computer system, or a combination thereof.

As an example embodiment for purposes of illustration only, the objective of the cybersecurity assessment test may be to uncover hidden URLs, endpoints, files, or folders. As an example, a hidden page may be an administrator page, with a URL test.com/Administrator. With correct security implementations in place, it may be difficult to find or identify this page. As described in detail later in the instant disclosure, the wordlist generator (103) may be trained to understand the naming schema and structures to certain pages. As a result, the wordlist generator (103) may generate generated words for the wordlist (103) that are closer to "real" words used for naming pages, for example, such as Admin_Page.aspx, FinancialReports_2023.docx, pageAdmin.jsf. Therefore, the words from the wordlist (103) generated by the wordlist generator (102) may have a greater chance of accessing the hidden URLs, endpoints, files, or folders when used for the cybersecurity assessment test, such as to conduct a subdirectory enumeration attack. Hence, then use of the generated words in the wordlist (102) will improve the performance of the cybersecurity assessment test.

As an example embodiment for purposes of illustration only, the objective of a penetration test may be to assess the vulnerability of a system to password cracking. As described in greater detail later in the instant disclosure, the wordlist generator (102) may be trained with real passwords that have been previously used by real people to access applications, files, servers etc. As a result, the wordlist generator (102) is trained to generate generated words for the wordlist (103) that closely resemble passwords selected, or created, by humans.

The accuracy of the cybersecurity assessment performed by the cybersecurity assessment system (104) greatly depends on the quality of the wordlist. In the present disclosure, the wordlist generator (102) is a machine-learned model. The generation of the wordlist by the wordlist generator (102) provides words that are "realistic" in that they closely resemble or follow word, or word formats, that are used for cybersecurity, such as passwords, usernames and directory names. Using an advanced wordlist (103) as provided by the present disclosure, cybersecurity assessments, such as penetration testing, can be more accurate, while also resulting in improved resources, such as more secure computer systems, and a reduction in time resources required to run cybersecurity assessments. The wordlist generator (102) and how it generates the wordlist (103) is described in further detail below.

According to one or more embodiments, the wordlist generator (102) is a machine-learned model. Machine learning, broadly defined, is the extraction of patterns and insights from data. The phrases "artificial intelligence," "machine learning," "deep learning," and "pattern recognition" are often convoluted, interchanged, and used synonymously throughout the literature. This ambiguity arises because the field of "extracting patterns and insights from data" was developed simultaneously and disjointedly among a number of classical arts like mathematics, statistics, and computer science. For consistency, the term machine learning (ML), will be adopted herein, however, one skilled in the art will recognize that the concepts and methods detailed hereafter are not limited by this choice of nomenclature.

Machine learning (ML) model types may include, but are not limited to, neural networks, random forests, generalized linear models, and Bayesian regression. Further, as defined herein, ML may include algorithmic search methods and optimization methods such as a line search or the genetic algorithm. ML model types are usually associated with additional "hyperparameters" which further describe the model. For example, hyperparameters providing further detail about a neural network may include, but are not limited to, the number of layers in the neural network, choice of activation functions, inclusion of batch normalization layers, and regularization strength. The selection of hyperparameters surrounding a model is referred to as selecting the model "architecture." Generally, multiple model types and associated hyperparameters are tested and the model type and hyperparameters that yield the greatest predictive performance on a hold-out set of data is selected.

In accordance with one or more embodiments, one or more machine learning modes described herein are based on, or may be understood as, a specialized artificial neural network (NN). Thus, a brief introduction to a NN is provided herein. However, it is noted that there are many variations and architectures of NNs networks. Therefore, one with ordinary skill in the art will recognize that any variation of the NN (or any other machine-learned model) may be employed without departing from the scope of this disclosure. Further, it is emphasized that the following discussion of a NN should not be considered limiting.

Figure 2:
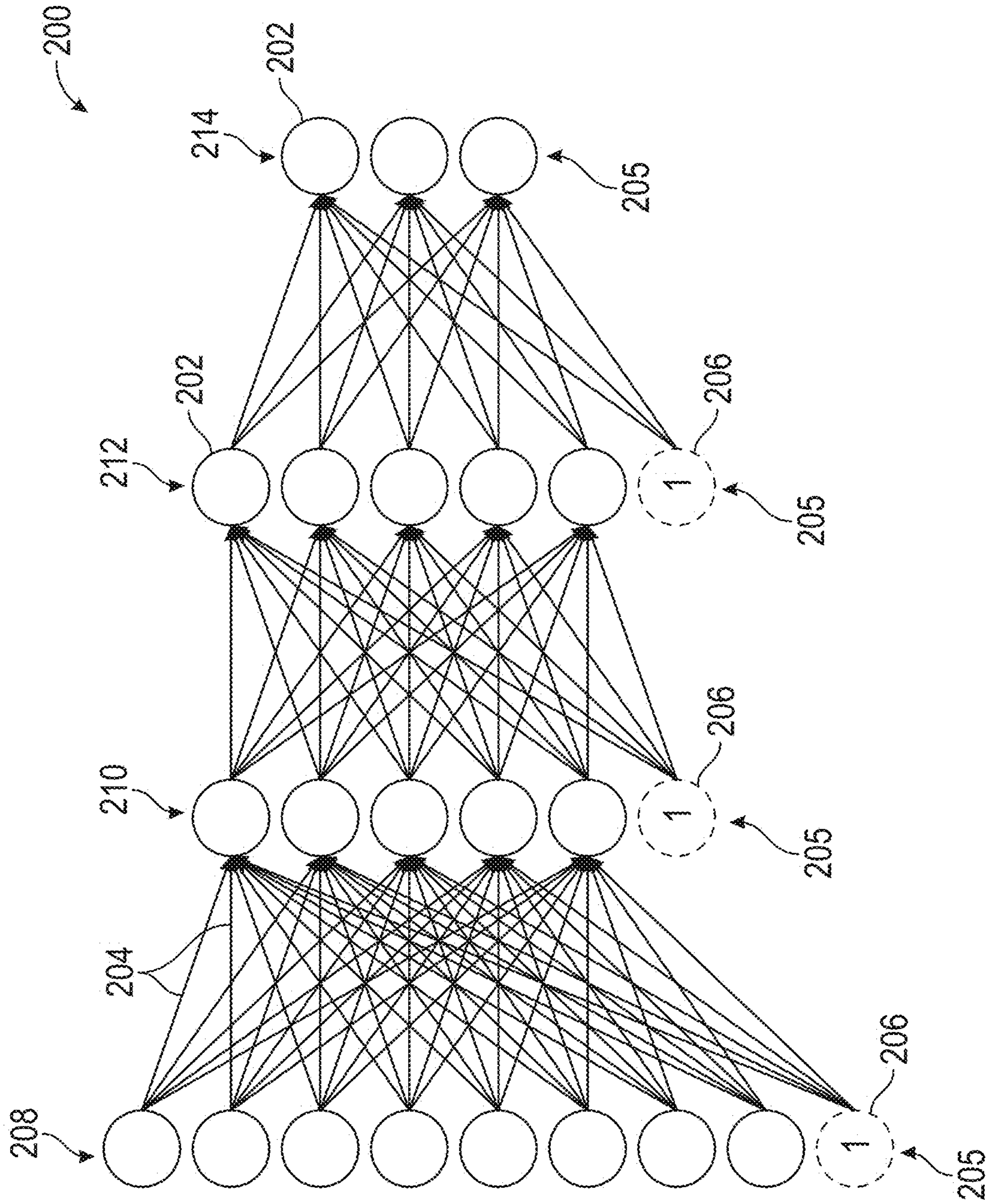
FIG. 2 depicts a neural network in accordance with one or more embodiments.

A diagram of a neural network is shown in FIG. 2. At a high level, a neural network (200) may be graphically depicted as being composed of nodes (202), where here any circle represents a node, and edges (204), shown here as directed lines. The nodes (202) may be grouped to form layers (205). FIG. 2 displays four layers (208, 210, 212, 214) of nodes (202) where the nodes (202) are grouped into columns, however, the grouping need not be as shown in FIG. 2. The edges (204) connect the nodes (202). Edges (204) may connect, or not connect, to any node(s) (202) regardless of which layer (205) the node(s) (202) is in. That is, the nodes (202) may be sparsely and residually connected. A neural network (200) will have at least two layers (205), where the first layer (208) is considered the "input layer" and the last layer (214) is the "output layer." Any intermediate layer (210, 212) is usually described as a "hidden layer." A neural network (200) may have zero or more hidden layers (210, 212) and a neural network (200) with at least one hidden layer (210, 212) may be described as a "deep" neural network or as a "deep learning method." In general, a neural network (200) may have more than one node (202) in the output layer (214). In this case the neural network (200) may be referred to as a "multi-target" or "multi-output" network.

Nodes (202) and edges (204) carry additional associations. Namely, every edge is associated with a numerical value. The edge numerical values, or even the edges (204) themselves, are often referred to as "weights" or "parameters." While training a neural network (200), numerical values are assigned to each edge (204). Additionally, every node (202) is associated with a numerical variable and an activation function. Activation functions are not limited to any functional class, but traditionally follow the form:

$$A = f\left(\sum_{i \in (incoming)} [(\text{node value})_i \, (\text{edge value})_i]\right), \quad \text{Equation (1)}$$

where i is an index that spans the set of "incoming" nodes (202) and edges (204) and $f$ is a user-defined function. Incoming nodes (202) are those that, when viewed as a graph (as in FIG. 2), have directed arrows that point to the node (202) where the numerical value is being computed. Some functions for $f$ may include the linear function $f(x)=x$, sigmoid function $$f(x) = \frac{1}{1+e^{-x}},$$

and rectified linear unit function $f(x)=\max(0, x)$, however, many additional functions are commonly employed. Every node (202) in a neural network (200) may have a different associated activation function. Often, as a shorthand, activation functions are described by the function $f$ by which it is composed. That is, an activation function composed of a linear function $f$ may simply be referred to as a linear activation function without undue ambiguity.

When the neural network (200) receives an input, the input is propagated through the network according to the activation functions and incoming node (202) values and edge (204) values to compute a value for each node (202). That is, the numerical value for each node (202) may change for each received input. Occasionally, nodes (202) are assigned fixed numerical values, such as the value of 1, that are not affected by the input or altered according to edge (204) values and activation functions. Fixed nodes (202) are often referred to as "biases" or "bias nodes" (206), displayed in FIG. 2 with a dashed circle.

In some implementations, the neural network (200) may contain specialized layers (205), such as a normalization layer, or additional connection procedures, like concatenation. One skilled in the art will appreciate that these alterations do not exceed the scope of this disclosure.

As noted, the training procedure for the neural network (200) includes assigning values to the edges (204). To begin training, the edges (204) are assigned initial values. These values may be assigned randomly, assigned according to a prescribed distribution, assigned manually, or by some other assignment mechanism. Once edge (204) values have been initialized, the neural network (200) may act as a function, such that it may receive inputs and produce an output. As such, at least one input is propagated through the neural network (200) to produce an output. A given training data set will be composed of inputs and associated target(s), where the target(s) represent the "ground truth," or the otherwise desired output. The neural network (200) output is compared to the associated input data target(s). The comparison of the neural network (200) output to the target(s) is typically performed by a so-called "loss function;" although other names for this comparison function such as "error function," "misfit function," and "cost function" are commonly employed. Many types of loss functions are available, such as the mean-squared-error function, however, the general characteristic of a loss function is that the loss function provides a numerical evaluation of the similarity between the neural network (200) output and the associated target(s). The loss function may also be constructed to impose additional constraints on the values assumed by the edges (204), for example, by adding a penalty term, which may be physics-based, or a regularization term. Generally, the goal of a training procedure is to alter the edge (204) values to promote similarity between the neural network (200) output and associated target(s) over the training data set. Thus, the loss function is used to guide changes made to the edge (204) values, typically through a process called "backpropagation."

While a full review of the backpropagation process exceeds the scope of this disclosure, a brief summary is provided. Backpropagation consists of computing the gradient of the loss function over the edge (204) values. The gradient indicates the direction of change in the edge (204) values that results in the greatest change to the loss function. Because the gradient is local to the current edge (204) values, the edge (204) values are typically updated by a "step" in the direction indicated by the gradient. The step size is often referred to as the "learning rate" and need not remain fixed during the training process. Additionally, the step size and direction may be informed by previously seen edge (204) values or previously computed gradients. Such methods for determining the step direction are usually referred to as "momentum" based methods.

Once the edge (204) values have been updated, or altered from their initial values, through a backpropagation step, the neural network (200) will likely produce different outputs.

Thus, the procedure of propagating at least one input through the neural network (200), comparing the neural network (200) output with the associated target(s) with a loss function, computing the gradient of the loss function with respect to the edge (204) values, and updating the edge (204) values with a step guided by the gradient, is repeated until a termination criterion is reached. Common termination criteria are: reaching a fixed number of edge (204) updates, otherwise known as an iteration counter; a diminishing learning rate; noting no appreciable change in the loss function between iterations; reaching a specified performance metric as evaluated on the data or a separate hold-out data set. Once the termination criterion is satisfied, and the edge (204) values are no longer intended to be altered, the neural network (200) is said to be "trained."

In one or more embodiments, the wordlist generator (102) is derived from a generative adversarial network (GAN). A detailed description of a GAN exceeds the scope of this disclosure, but a summary is provided herein. A GAN is generally composed of two machine-learned models that interact cyclically with a configuration to perform opposing tasks. The GAN is typically composed of two parts, a generator (or generator model) and a discriminator (or discriminator model). The task of the generator is to produce a data object (e.g., a word) such that the generated object is indiscernible from a real, or a target, data object (e.g., a word from known wordlists). The task of the discriminator is to determine if a given data object is real or if the given data object was produced by the generator. In the case of the present disclosure, the generator is tasked with producing a generated word, and the discriminator is tasked with determining if the generated word is "real" (e.g., taken from known wordlists). Thus, these tasks work in opposition (i.e., adverse, or adversarial) because the generator is tasked to produce a data object that cannot be distinguished from a real data object by the discriminator while the discriminator is specifically tasked to identify data objects generated by the generator. As with the previously described NN, the generator and discriminator of a GAN (each a machine-learned model in itself) are parameterized by a set of weights (or edge values) that must be learned during training. Training the GAN consists of determining the weights that minimize a given loss function, as described further below.

Figure 3:
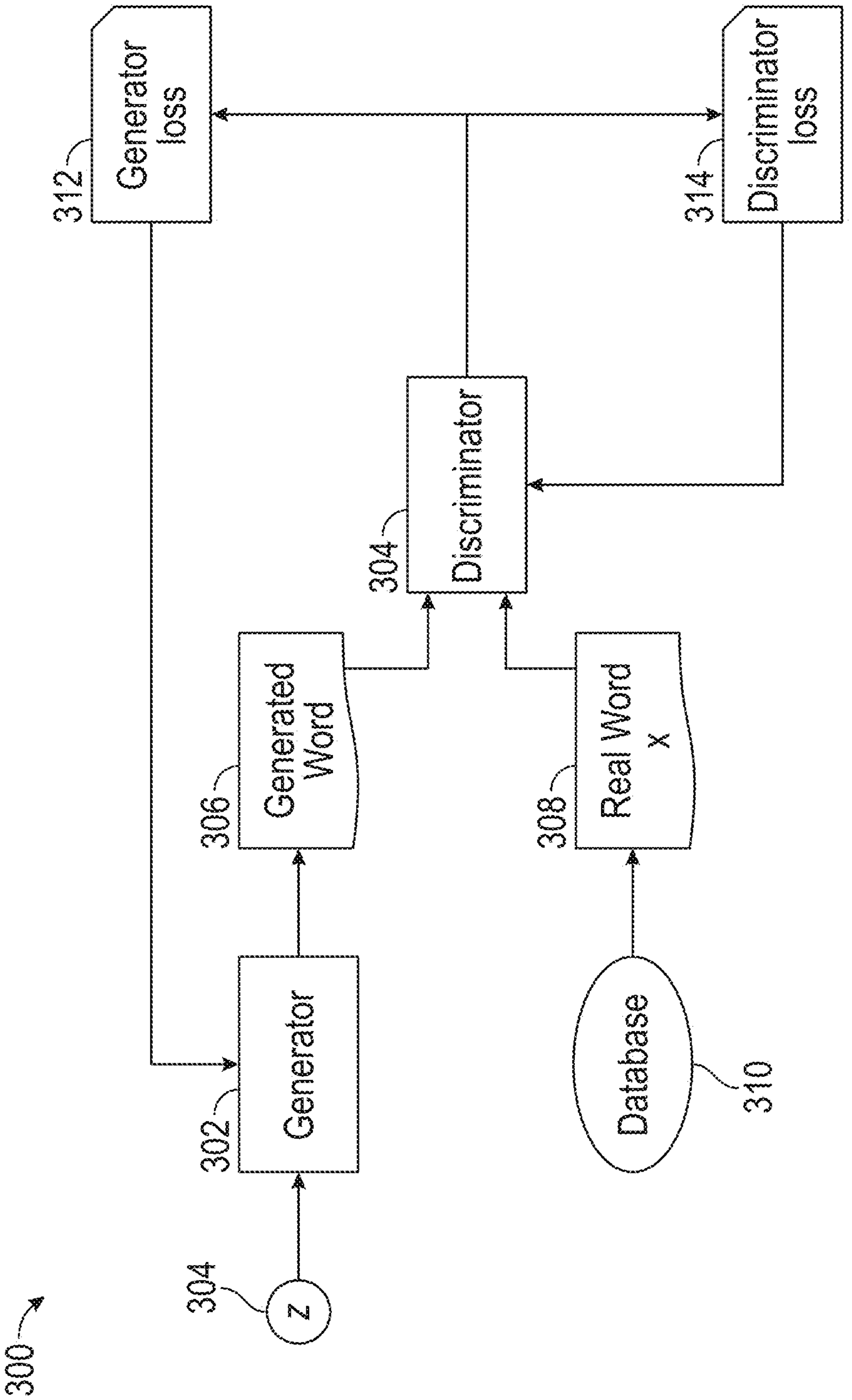
FIG. 3 depicts a generative adversarial network in accordance with one or more embodiments.

FIG. 3 illustrates a GAN (300) according to one or more embodiments. The GAN (300) comprises a generator (302) and a discriminator (304), in accordance with the above description of a GAN. To begin training the GAN (300), the generator (302) receives an input z (301). According to one or more embodiments, the input z (301) may be a random noise vector sampled from a normal or uniform distribution. However, the input z (301) may be conditioned based on other information such as metadata or other vector indicative of the use case of the output of the generator (302). Using the input z (301), the generator (302) generates and outputs a generated word (306).

The discriminator receives a data sample which can be either the generated word (306), or a real word (308) from the database (310). The task of the discriminator (304) is to distinguish between real and fake data. The discriminator (304) outputs a value representing a probability that the input data sample is real. Conventionally, a value close to 1 indicates that the data sample is likely real, while a value close to 0 indicates that the data sample is likely fake.

Following the determination by the discriminator (304), a generator loss (312) and a discriminator loss (314) are determined. According to one or more embodiments, the loss functions should reflect the distance between the distribution of the data generated by the generator (302) of the GAN (300) and the distribution of the real data in the database (310). Two common GAN loss functions include minimax loss function, and Wasserstein loss function, however other loss functions may be used.

As an example of a loss function to be used in training the GAN (300), the minimax function will be described here. In particular, the generator (302) tries to minimize the minimax function while the discriminator (304) tries to maximize it. The minmax function is given by:

$$E_x[\log(D(x))] + E_z[\log(1 - D(G(z)))] \quad \text{Equation (2)}$$

D(x) is the discriminator's estimate of the probability that real data instance x is real. $E_x$ is the expected value over all real data instances. G(z) is the generator's output when given input z. D (G(z)) is the discriminator's estimate of the probability that a fake instance is real. $E_z$ is the expected value over all random inputs to the generator (in effect, the expected value over all generated fake instances G(z)).

The generator (302) cannot directly affect the log(D(x)) term in the above function, so, for the generator (302), minimizing the loss is equivalent to minimizing log(1−D(G (z))).

Using Equation (2) both the generator loss (312) and the discriminator loss (314) may be determined. The generator loss (312) is then used to guide and update the weights of the generator (302), and the discriminator loss (314) is used to guide and update the weights of the discriminator (304). This process is repeated during training to provide a generator (302) that can produce a generated word (306) with an acceptable level of realism, such as, for example, when the output of the discriminator (304), when considering a generated word (306), is consistently within a certain threshold.

As an example, when an output value of the discriminator (304) close to 1 indicates that the generated word (306) is considered by the discriminator (304) to be likely real, and an output value of the discriminator (304) close to 0 indicates that the generated word (306) is considered to be likely generated/fake, then an output value of 0.5 indicates that the discriminator (304) is unable to distinguish between real and fake words. Therefore, according to one or more embodiments, the threshold may be the range of 0.4 to 0.6.

According to one or more embodiments, once trained, the discriminator (304) of the GAN (300) is discarded and the generator (302) is used as the wordlist generator (102) to generate words with sufficient realism for the wordlist (103). Alternatively, according to one or more embodiments, once trained the discriminator (304) is not discarded, and both the discriminator (304) and the generator (302) are used as the wordlist generator (102). In these embodiments the generator (302) is used to generate words for the wordlist (103) and the discriminator (304) is used to filter or remove words that are not determined to have sufficient realism, e.g., using a threshold. Accepted generated words are added to the wordlist (103).

For example, when the discriminator (304) outputs a probability value of 0.5, it indicates that it cannot determine if a generated word is real or fake. According to one or more embodiments, a generated word is accepted to be included in the wordlist (103) if the discriminator (304) output is equal to or above 0.4 (i.e., the discriminator does not indicate with high probability that a generated word is fake). According to one or more embodiments, a generated word is accepted to be included in the wordlist (103) if the discriminator (304) output is equal to or above 0.7 and less than or equal to 1 (i.e., the discriminator accepts the generated word as being "real" with 70% or more certainty).

According to one or more embodiments, the quality of the generated words for the wordlist (103) may be assessed, and based on the assessment it may be decided to further train the GAN (300) to generate an improved wordlist generator (102). For example, words of the wordlist (300) may be assessed for their relevance, diversity and correctness, and the wordlist generator (103) may be assessed for its perplexity and entropy. In other words, the quality of the training of the GAN may be assessed by the quality of its outputs. According to one or more embodiments, once the wordlist generator (102) has been used to generate a wordlist (103) for a cybersecurity assessment test, the performance of the wordlist (103) in identifying a systems vulnerability to a cybersecurity attack in comparison to the performance of known (published) wordlists may indicate if the wordlist generator has been trained sufficiently. For example, if the wordlist (103) generated by the wordlist generator (102) performs worse than a known (published) wordlist in identifying a systems vulnerability to a cybersecurity attack, then it may be decided to further train the GAN (300) to generate an improved wordlist generator (102).

In practice, one with ordinary skill in the art will appreciate that many adaptations and alterations can be made to the general GAN (300) architecture of FIG. 3 without departing from the scope of this disclosure.

Figure 4:
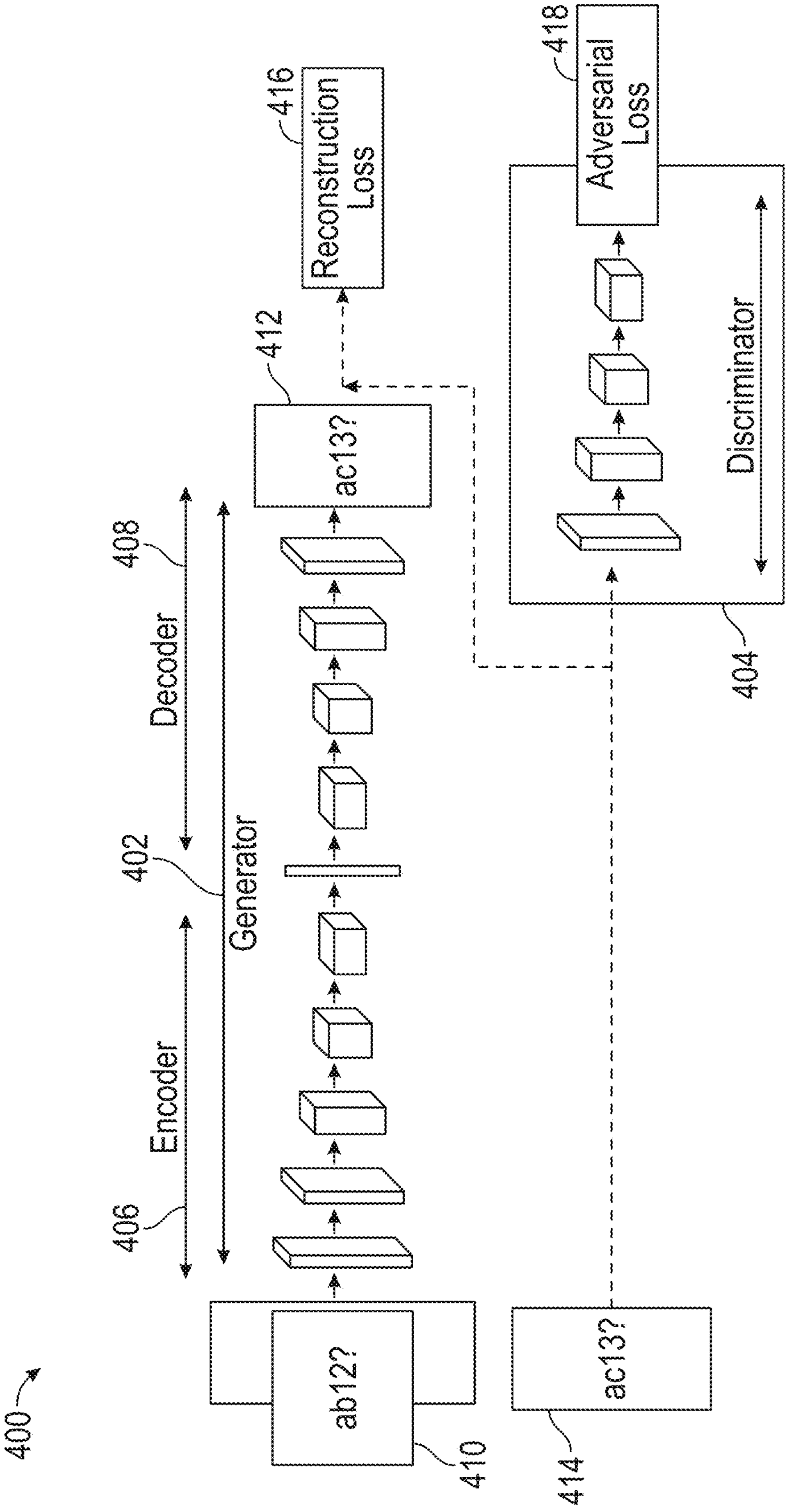
FIG. 4 depicts a generative adversarial network in accordance with one or more embodiments.

According to one or more embodiments, the GAN may make use of one or more types of machine learning models. As an example, the GAN can use an autoencoder as the generator model (and further, the encoder and decoder of the autoencoder can be composed of other types of machine learning models such as transformers) and a recurrent neural network (RNN) as the discriminator. FIG. 4 depicts the general architecture of GAN (400) utilizing an autoencoder as the generator model, in accordance with one or more embodiments.

The GAN (400) includes two primary components: a generator (402) and a discriminator (404), in accordance with the description above of a GAN. Both the generator (402) and the discriminator (404) may be composed of blocks. The blocks can represent layers in a neural network or other operative functions such as convolution, concatenation, attention, normalization, dropout, processing by an activation function, and others not listed.

The generator (402), configured as an autoencoder (or variation thereof such as a variational autoencoder), may be considered the combination of two individual operators: an encoder (406) and a decoder (408). In the case of the present disclosure, the generator (402) may begin with an input word (410) with no predetermined properties, or an input word with predetermined properties. Alternatively, according to one or more embodiments, the input word (410) may be a noise vector. Through the processes of encoding by the encoder (406) and decoding by the decoder (408), the generator processes the input word (410) and outputs a generated word (412) that may be different than the input word (410). Generally, the encoder (406) may be composed of blocks that act to compress elements of the input word (410). The role of the decoder (408) is to decompress the encoded input word (410) to form the generated word (412). The encoder (406) and decoder (408) can each be machine learning models, e.g., transformers According to one or more embodiments, the generator (402) is configured to accept properties, which may include metadata and features as discussed further below. These properties may be used to condition a latent space of the generator (402).

In one or more embodiments, the discriminator (404) is also composed of blocks that may form a machine learning model, e.g., an RNN. The role of the discriminator is to determine whether a sample word (414) was generated using the generator (i.e., is a generated word (412)) or originated from a given dataset (i.e., is "real"). Considering the application of the GAN that is used to generate words for a wordlist, the role of the generator (402) is to begin with an input word (410) and apply processes of encoding and decoding, and obtain a generated word (412), where the processing is guided by properties, such as metadata and/or features, described further below, to ensure the generated word (412) is realistic. The GAN may then use the discriminator (404) to evaluate the sample word (414), which may be similar to or the same as the generated word (412) just described. However, the discriminator (304) may also consider sample words (414) that are real (e.g., existing in the database) in order to further evaluate its ability to discriminate between real and fake (or generated) words. In practice, one with ordinary skill in the art will appreciate that many adaptations and alterations can be made to the general GAN (400) architecture of FIG. 4 without departing from the scope of this disclosure.

As with the machine learning models previously described both the generator (402) of the GAN (400) and the discriminator (404) of the GAN (400) may be parameterized by a set of weights (or edge values). Training the GAN (400) includes determining the weights that minimize a given loss function. GANs (300) that utilize autoencoders commonly include two classes of loss functions, namely, reconstruction loss (416) and adversarial loss (418). Reconstruction loss (416) refers to a measure of difference calculated directly between generated words (412) and real words. During training, the generator (402) receives input-target pairs and seeks to minimize the reconstruction loss. The reconstruction loss may be calculated where the input word (410) is the same as the generated word (412). To minimize the reconstruction loss, the generator (402) is encouraged to produce generated words (412) that are similar to the input word (410).

According to one or more embodiments, the adversarial loss (418) includes the generator loss and discriminator loss described above. According to one or more embodiments, the adversarial loss (418) may be determined using a loss function such as a minimax loss function, as described above, a Wasserstein loss function or another type of loss function.

During training, the discriminator (404) receives sample words (414) that include both "real" words and "fake" words (generated words (412)) generated by the generator (402). The adversarial loss (418) may be calculated for each sample word (414) and in this case, quantifies how closely the probability distributions of one or more properties present in the proposed word resemble the probability distribution of the same one or more properties in real word data. Following the same example from above, the adversarial loss quantifies how closely the probability of properties in the generated word compares to the probability models of real words. Again, it is emphasized that the preceding example is only to be considered as an illustration of how a GAN (400) might be trained and should not be considered limiting. Many alterations to the training procedure described above are known to those skilled in the art.

Both the reconstruction loss (316) and the adversarial loss (318) are used to guide and update the weights of both the discriminator (304) and the generator (302). In other words, guided by both the reconstruction loss (316) and the adversarial loss (318), the weights of the generator (302) are updated to produce a generated word (412), which cannot be distinguished from an original (or real) word by the discriminator (304).

According to one or more embodiments, once trained, the discriminator (404) of the GAN and the encoder (406) of the generator (402) are discarded and the decoder (408) of the generator (402) is used as the wordlist generator (102) to generate words with sufficient realism for the wordlist (403). Alternatively, according to one or more embodiments, once trained the discriminator (304) is not discarded, and both the discriminator (304) and the decoder (408) of the generator (402) are used as the wordlist generator (102). In these embodiments the decoder (408) of the generator (402) is used to generate words for the wordlist (103) and the discriminator (304) is used to filter or remove words that are not determined to have sufficient realism, e.g., using a threshold. Accepted generated words are added to the wordlist (103).

In practice, one with ordinary skill in the art will appreciate that many adaptations and alterations can be made to the general GAN (300) architecture of FIG. 3 without departing from the scope of this disclosure.

Figure 5:
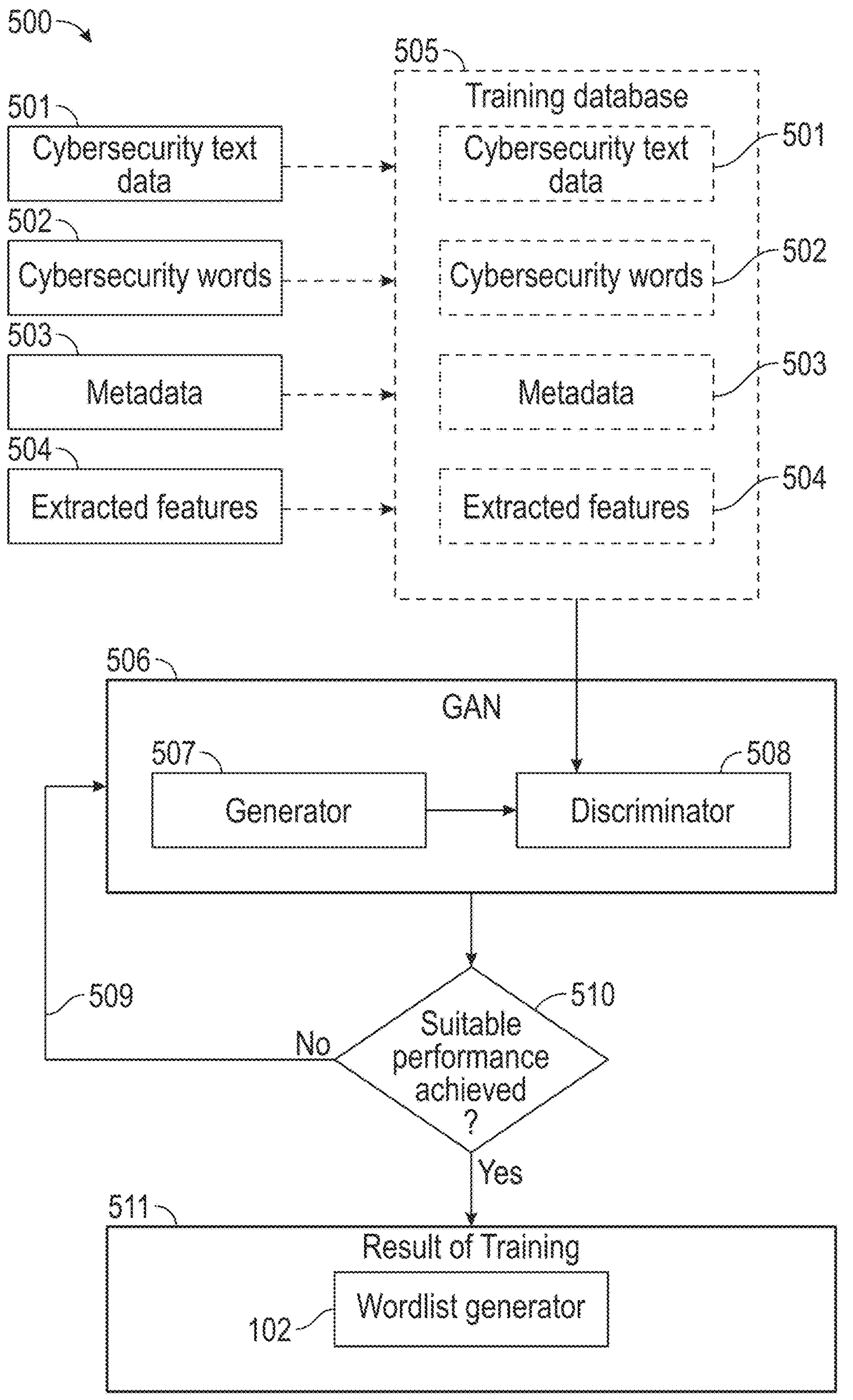
FIG. 5 depicts a process to provide a wordlist generator in accordance with one or more embodiments.

In accordance with one or more embodiments, FIG. 5 illustrates a training setting (500) for training a GAN (506), such as the GAN (300) of FIG. 3 or the GAN (400) of FIG. 4. The training setting (500) includes the elements and operators involved in deriving a wordlist generator (102), in accordance with one or more embodiments.

According to one or more embodiments, to facilitate training of the GAN (506), a set of text data relevant to cybersecurity is obtained. Such text data is herein referred to as cybersecurity text data (501). The cybersecurity text data (501) can include textbooks, rules for generating valid inferences or expressions within a formal language. The cybersecurity text data (501) may additionally include known wordlists used in different domains.

From the cybersecurity text data (501) a set of cybersecurity words (502) is identified.

According to one or more embodiments, the set of cybersecurity words (502) is labeled with metadata (503). The metadata (503) may identify cybersecurity text data (501) from which a cybersecurity word (502) was identified. The metadata (503) may identify use cases of the cybersecurity text data (501) (from which the cybersecurity word (502) is identified) in cybersecurity. Examples of metadata labels to identify the use cases include password cracking, directory enumeration, and username guessing. The listed labels here are not to be considered exhaustive or limiting, and additional labels may be easily incorporated without departing from the scope of the disclosure.

According to one or more embodiments, features (504) are extracted from the cybersecurity text data (501). The extracted features (504) may relate to natural language processing such as linguistic characteristics and relationships between words. Feature extraction methods may be applied to the complete text data and individual words, and include Bag of Words (BoW), a hybrid method combining Bag of Words (BoW) and autoencoders. For example illustration purposes only, BoW may determine features such as word frequency, co-occurrence patterns, and contextual usage.

According to one or more embodiments, the output of the feature extraction step is a vectorized representation of these features that the GAN (506) can process during training.

According to one or more embodiments, additional data processing may be carried out on the cybersecurity text data (501), the cybersecurity words (502), the metadata (503), and/or the extracted features (504). Pre-processing may include activities such as concatenation, filtering and/or smoothing of the data, scaling (e.g., normalization) of the data, and outlier removal. The data preprocessing may include vectorization and encoding of words to facilitate training of the GAN (300).

According to one or more embodiments, the cybersecurity text data (501), the cybersecurity words (502), the metadata (503), and/or the extracted features (504) are stored in a training database (505).

As an illustrative example only, Table 1 below illustrates an example entry in the training database (505).

TABLE 1

| Word | Metadata Description | Metadata Source | Metadata Common uses | Metadata Word type | Metadata Relation | Metadata Technology |
|---|---|---|---|---|---|---|
| Java | Software, programming language | seclists | Directory enumeration | noun | example_technology | 1 |

The word is a cybersecurity word (502) identified from the cybersecurity text data. The metadata description is a description of the cybersecurity word. The metadata source is the source of the word such as a document in the cybersecurity text data. The metadata common uses is an indication of a use case in cybersecurity associated with the word. The metadata word type indicates if the word is a noun, verb, adjective, adverb etc. The metadata relation indicates the relation between this word and the other words within the list. The metadata technology is a Boolean (e.g., True or False, 1 or 0) determining if the word is technology related or not. As a further example, for a word like "firewall", the database may include metadata such as word type (noun), relation (security component), and technology (networking).

Additionally, not shown in Table 1, the entry may also comprise features obtained during feature extraction and including one of word frequency, co-occurrence patterns, and contextual usage.

As shown in FIG. 5, using the training database (505), the GAN (506) undergoes a training loop (509). During training, both the generator (507) of the GAN (506) and the discriminator (508) of the GAN (506) interact with the training database (505). The generator (507) receives the words, such as the cybersecurity words (502), and the metadata (503) and the extracted features (504). According to one or more embodiments, at least one of the metadata (503) and the extracted features (504) condition the latent space of the generator (507). According to one or more embodiments, the discriminator (508) determines whether words generated by the generator (507) fit within a context provided by the metadata and features. The objective of the GAN (506) may be to generate a word according to one or more pre-specified word properties (i.e., having properties similar to a subset of words in the database). The GAN (506) may be trained in training loop (509) in a manner as described with respect to FIG. 3 and FIG. 4, wherein at least one loss function is used to guide the updating of the weights of the generator (507) and discriminator (508) of the GAN (506).

According to one or more embodiments, during training, the generator (507) may be trained as outlined in FIG. 3. The generator (507) may receive an input z. According to one or more embodiments, the input z may be a random noise vector sampled from a normal or uniform distribution, a word or other vector, or a word from the cybersecurity words (502). Using the input z, the generator (507) outputs a generated word. According to one or more embodiments, the generator (507) may be guided by the metadata (503) or extracted features (504) of the training database (505).

According to one or more embodiments, during training, the discriminator (508) may be provided with sample words including words from the cybersecurity words (502) of the training database (505) and generated words generated by the generator (507). That is, the discriminator (508) receives sample words that include both "real" words and "fake" words generated by the generator (507). The discriminator (508) calculates the probability that the sample word belongs to the cybersecurity words (502) of the training database using the metadata 503 and the extracted features (504). A generator loss and a discriminator loss may be calculated for each sample word and in this case, quantify how closely the probability distributions of one or more properties present in the sample word resemble the probability distribution of the same one or more properties of the cybersecurity words (502) of the training database (505). Again, it is emphasized that the preceding example is only to be considered as an illustration of how a GAN (506) might be trained and should not be considered limiting. Many alterations to the training procedure described above are known to those skilled in the art.

Once the GAN (506) has achieved a suitable performance (510), then the GAN (506) may be considered to be trained. Once trained, the discriminator of the GAN (506) may be discarded and the generator (507) may be used as the wordlist generator (102). Alternatively, both the generator (302) and the discriminator (304) may be used as the wordlist generator (102). Alternatively, in the case where the generator (507) is an autoencoder, only the decoder of the generator (507) may be used as the wordlist generator (102) or the decoder of the generator in combination with the discriminator (508) may be used as the wordlist generator (102). The result of training (511) the GAN (506) may be considered to be the generation of the wordlist generator (102).

Referring back to FIG. 1, according to one or more embodiments, once trained the wordlist generator can be deployed to generate words for a wordlist (103) that is to be used by a cybersecurity assessment system (104). A user or system may provide a wordlist property (108) to the wordlist generator (102). The wordlist property (108) describes at least one property of the words to be generated by the wordlist generator. According to one or more embodiments, the at least one property includes one of a common use of a word, a word type (noun or verb), a relation (e.g., a synonym, an antonym), an intended use of the wordlist (e.g., directory enumeration), or a technology related to the word. The wordlist generator (102) uses the wordlist property (108) to guide the generation of generated words by the wordlist generator (102). As an example embodiment for illustration purposes only, if the wordlist property (108) is "system command", the wordlist (103) may comprise words such as "Is", "dir" or "cd".

Figure 6:
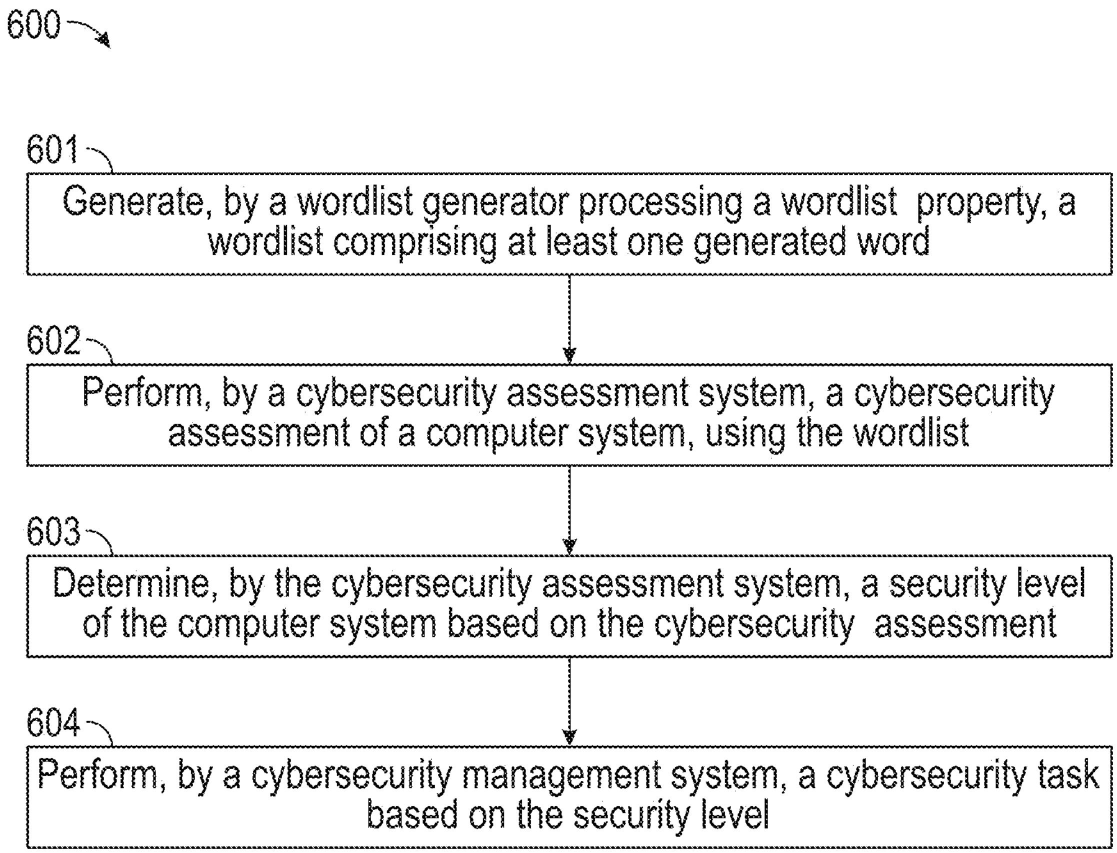
FIG. 6 depicts a flowchart in accordance with one or more embodiments.

The operation of using a wordlist generator for cybersecurity assessment is summarized in the flow chart of FIG. 6 according to one or more embodiments. In Block 601, a wordlist is generated by a wordlist generator. The wordlist comprises at least one generated word. According to one or more embodiments, the wordlist generator has been generated by training a generative adversarial network (GAN) to output generated words using a training set including target words, the GAN including a generator model and a discriminator model, and deriving the wordlist generator from the trained GAN.

In Block 602, a cybersecurity assessment of a computer system is performed by a cybersecurity assessment system using the wordlist. According to one or more embodiments, the cybersecurity assessment system performs an analysis of the computer system, utilizing the generated wordlist to probe for vulnerabilities or weak points. According to one or more embodiments, the cybersecurity assessment may involve enumerating system commands or assessing password strength.

According to one or more embodiments, in Block 603, the cybersecurity assessment system determines a security level of the computer system based on the cybersecurity assessment. According to one or more embodiments, based on the results of the cybersecurity assessment, a security level may be assigned to the computer system. According to one or more embodiments, the security level may be influenced by factors like the presence of vulnerabilities, misconfigurations, or weak authentication protocols.

According to one or more embodiments, in Block 604, a cybersecurity management system performs a cybersecurity task based on the security level. According to one or more embodiments, the cybersecurity task includes controlling user and password management related to the computer system, enabling or disabling protocols of the computer system, applying secure encryption algorithms to the computer system, or a combination thereof.

Figure 7:
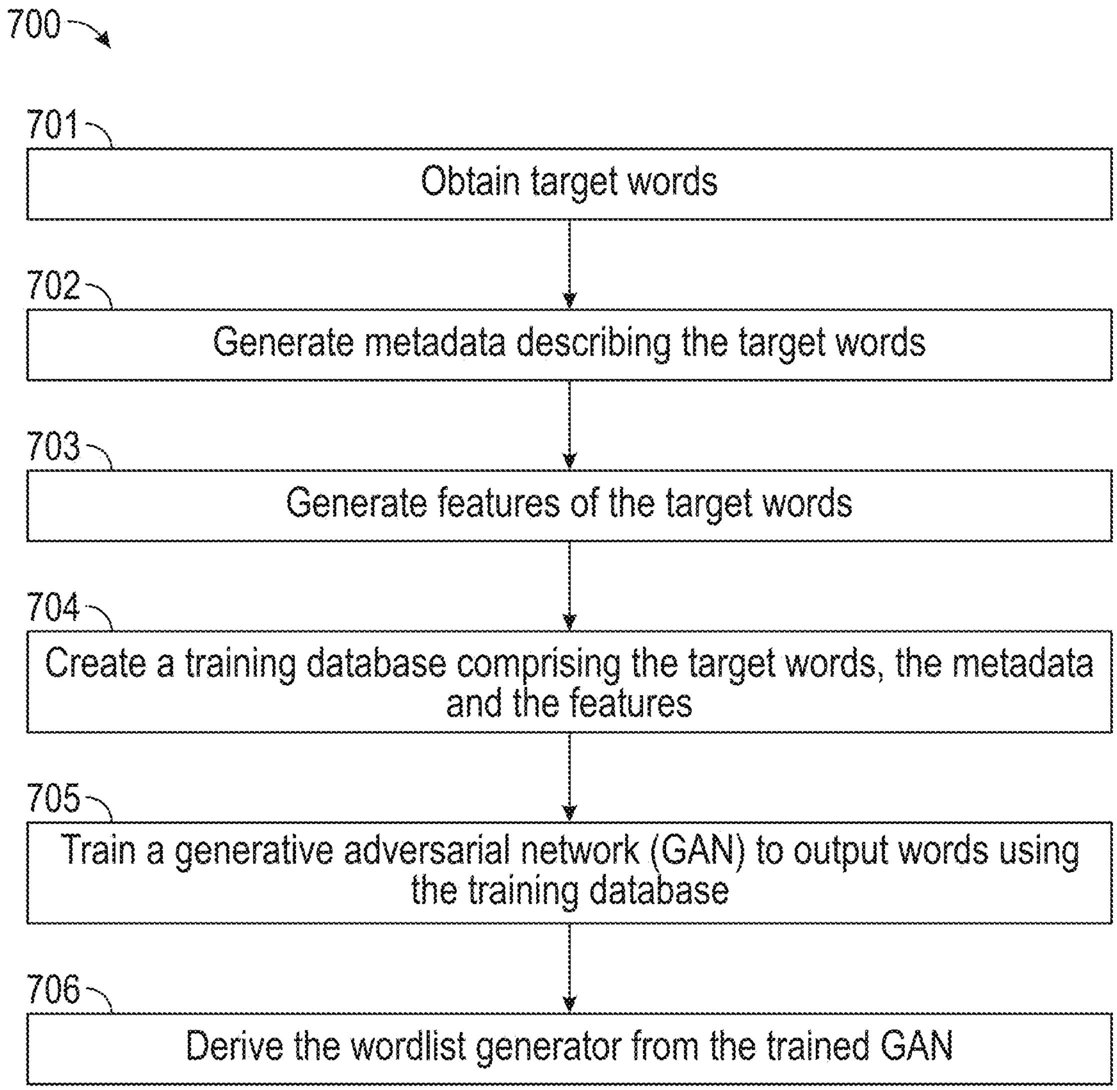
FIG. 7 depicts a flowchart in accordance with one or more embodiments.

The operation of training a machine-learned network to obtain a wordlist generator is summarized in the flow chart of FIG. 7.

In Block 701, target words are obtained. The target words are obtained from text data such as textbooks, websites, or known wordlists.

In Block 702, metadata that describes the target words is generated. According to one or more embodiments, the metadata may identify cybersecurity text data from which a word was identified. The metadata may identify use cases of the cybersecurity text data from which the cybersecurity word is identified. For example, in one or more embodiments, the collected data is labeled with metadata pertaining to its relevant use cases in cybersecurity such as password cracking/directory enumeration/username guessing.

In Block 703, features of the target words are generated. Specifically, features relating to natural language processing are extracted, such as linguistic characteristics and relationships between words, such as parts of speech, syntactic relations, and semantic similarities.

According to one or more embodiments, these features are vectorized and encoded into a format suitable for training the GAN. The encoded vectors serve as input to both the generator and discriminator during the training process.

In Block 704, a training database is created including the target words, the metadata and the features. Specifically, formal datasets may be created and stored using the data collected and cleaned in the previous steps to enable the training phase.

In Block 705, a generative adversarial network (GAN) is trained to output words using the training database. The GAN includes a generator and a discriminator. In one or more embodiments, the training is semi-supervised (i.e., using a labeled dataset) in the form of the transformer architecture, specifically autoregression neural networks. According to one or more embodiments, the generator is an autoencoder and a latent space of the autoencoder is conditioned using the metadata and the extracted features.

In Block 706, the wordlist generator is derived from the trained GAN. According to one or more embodiments, the wordlist generator is the generator model of the trained GAN or a portion of the generator model (e.g., the decoder). According to one or more embodiments, the wordlist generator includes the generator model and the discriminator model of the trained GAN.

The aim of embodiments disclosed herein is to provide a modern outlook to wordlist creation, which provides reliable and more accurate results to many cybersecurity practices such as directory enumeration, password cracking, and many more use cases. Furthermore, the use of large datasets incorporating old wordlists and their metadata is crucial as the GAN model will only perform as good as the dataset it was trained with. This approach is optimal to the natural language processing (NLP) inherently associated with such an invention. Embodiments disclosed herein improve the process of penetration testing and provide security quality assurance across different applications. Value is also provided in access control and management, preventing the use of easily predicted credentials.

Figure 8:
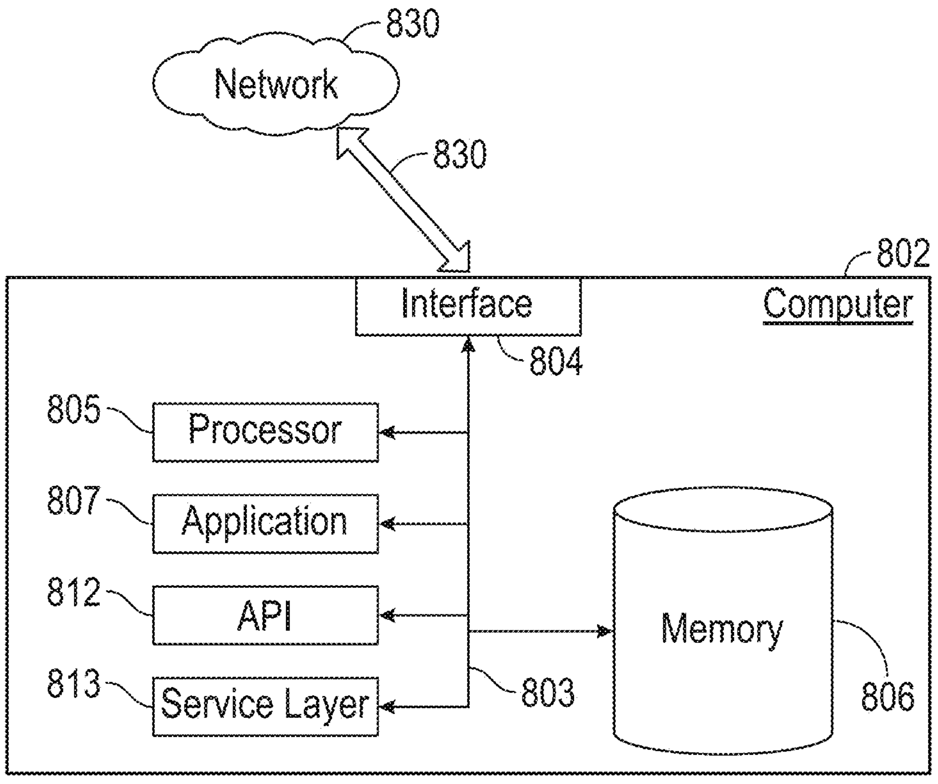
FIG. 8 depicts a system in accordance with one or more embodiments.

Embodiments of the present disclosure may be implemented on a computer system. FIG. 8 is a block diagram of a computer system (802) used to provide computational functionalities associated with described algorithms, methods, functions, processes, flows, and procedures as described in the instant disclosure, according to one or more embodiments. The illustrated computer (802) is intended to encompass any computing device such as a server, desktop computer, laptop/notebook computer, wireless data port, smart phone, personal data assistant (PDA), tablet computing device, one or more processors within these devices, or any other suitable processing device such as an edge computing device, including both physical or virtual instances (or both) of the computing device. An edge computing device is a dedicated computing device that is, typically, physically adjacent to the process or control with which it interacts.

Additionally, the computer (802) may include a computer that includes an input device, such as a keypad, keyboard, touch screen, or other device that can accept user information, and an output device that conveys information associated with the operation of the computer (802), including digital data, visual, or audio information (or a combination of information), or a GUI.

The computer (802) can serve in a role as a client, network component, a server, a database or other persistency, or any other component (or a combination of roles) of a computer system for performing the subject matter described in the instant disclosure. In some implementations, one or more components of the computer (802) may be configured to operate within environments, including cloud-computing-based, local, global, or other environment (or a combination of environments).

At a high level, the computer (802) is an electronic computing device operable to receive, transmit, process, store, or manage data and information associated with the described subject matter. According to some implementations, the computer (802) may also include or be communicably coupled with an application server, e-mail server, web server, caching server, streaming data server, business intelligence (BI) server, or other server (or a combination of servers).

The computer (802) can receive requests over network (830) from a client application (for example, executing on another computer (802) and responding to the received requests by processing the said requests in an appropriate software application. In addition, requests may also be sent to the computer (802) from internal users (for example, from a command console or by other appropriate access method), external or third-parties, other automated applications, as well as any other appropriate entities, individuals, systems, or computers.

Each of the components of the computer (802) can communicate using a system bus (803). In some implementations, any or all of the components of the computer (802), both hardware or software (or a combination of hardware and software), may interface with each other or the interface (804) (or a combination of both) over the system bus (803) using an application programming interface (API) (812) or a service layer (813) (or a combination of the API (812) and service layer (813). The API (812) may include specifications for routines, data structures, and object classes. The API (812) may be either computer-language independent or dependent and refer to a complete interface, a single function, or even a set of APIs. The service layer (813) provides software services to the computer (802) or other components (whether or not illustrated) that are communicably coupled to the computer (802). The functionality of the computer (802) may be accessible for all service consumers using this service layer. Software services, such as those provided by the service layer (813), provide reusable, defined business functionalities through a defined interface. For example, the interface may be software written in JAVA, C++, or other suitable language providing data in extensible markup language (XML) format or another suitable format. While illustrated as an integrated component of the computer (802), alternative implementations may illustrate the API (812) or the service layer (813) as stand-alone components in relation to other components of the computer (802) or other components (whether or not illustrated) that are communicably coupled to the computer (802). Moreover, any or all parts of the API (812) or the service layer (813) may be implemented as child or sub-modules of another software module, enterprise application, or hardware module without departing from the scope of this disclosure.

The computer (802) includes an interface (804). Although illustrated as a single interface (804) in FIG. 8, two or more interfaces (804) may be used according to particular needs, desires, or particular implementations of the computer (802). The interface (804) is used by the computer (802) for communicating with other systems in a distributed environment that are connected to the network (830). Generally, the interface (804) includes logic encoded in software or hardware (or a combination of software and hardware) and operable to communicate with the network (830). More specifically, the interface (804) may include software supporting one or more communication protocols associated with communications such that the network (830) or interface's hardware is operable to communicate physical signals within and outside of the illustrated computer (802).

The computer (802) includes at least one computer processor (805). Although illustrated as a single computer processor (805) in FIG. 8, two or more processors may be used according to particular needs, desires, or particular implementations of the computer (802). Generally, the computer processor (805) executes instructions and manipulates data to perform the operations of the computer (802) and any algorithms, methods, functions, processes, flows, and procedures as described in the instant disclosure.

The computer (802) also includes a memory (806) that holds data for the computer (802) or other components (or a combination of both) that can be connected to the network (830). The memory may be a non-transitory computer readable medium. For example, memory (806) can be a database storing data consistent with this disclosure. Although illustrated as a single memory (806) in FIG. 8, two or more memories may be used according to particular needs, desires, or particular implementations of the computer (802) and the described functionality. While memory (806) is illustrated as an integral component of the computer (802), in alternative implementations, memory (806) can be external to the computer (802).

The application (807) is an algorithmic software engine providing functionality according to particular needs, desires, or particular implementations of the computer (802), particularly with respect to functionality described in this disclosure. For example, application (807) can serve as one or more components, modules, applications, etc. Further, although illustrated as a single application (807), the application (807) may be implemented as multiple applications (807) on the computer (802). In addition, although illustrated as integral to the computer (802), in alternative implementations, the application (807) can be external to the computer (802).

There may be any number of computers (802) associated with, or external to, a computer system containing computer (802), wherein each computer (802) communicates over network (830). Further, the term "client," "user," and other appropriate terminology may be used interchangeably as appropriate without departing from the scope of this disclosure. Moreover, this disclosure contemplates that many users may use one computer (802), or that one user may use multiple computers (802).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:

generating, by a wordlist generator processing a wordlist property, a wordlist comprising at least one generated word, wherein the wordlist generator has been generated by:

training a generative adversarial network (GAN) to output generated words using a training set comprising target words, the GAN comprising a generator model and a discriminator model, wherein the generator model and the discriminator model are machine-learning models; and deriving the wordlist generator from the trained GAN; and performing, by a cybersecurity assessment system, a cybersecurity assessment of a computer system, using the wordlist, wherein the wordlist generator comprises the generator model and the discriminator model of the trained GAN, wherein generating the wordlist comprises:

generating by the generator model a generated word using the wordlist property;

determining, using the discriminator model, that the generated word is to be added to the wordlist; and adding the generated word to the wordlist.

2. The method of claim 1, further comprising:

determining, by the cybersecurity assessment system, a security level of the computer system based on the cybersecurity assessment; and performing, by a cybersecurity management system, a cybersecurity task based on the security level.

3. The method of claim 2, wherein the cybersecurity task comprises one of controlling user and password management related to the computer system, enabling or disabling protocols of the computer system, and applying secure encryption algorithms to the computer system.

4. The method of claim 1, wherein the cybersecurity assessment is a penetration test configured to determine a resilience of the computer system to a brute force attack, or a directory enumeration attack.

5. The method of claim 1, wherein performing the cybersecurity assessment comprises:

inputting a generated word from the wordlist into an input field of a user interface associated with the computer system, the input field configured to allow or deny access to a resource of the computer system; and based on the inputting of the word, determining if the resource is accessible.

6. The method of claim 1, wherein the training set further comprises at least one of:

metadata to describe the target words; and features of the target words.

7. A system, comprising:

a wordlist generator configured to generate a wordlist upon processing a wordlist property, the wordlist comprising at least one generated word, wherein the wordlist generator has been generated by:

training a generative adversarial network (GAN) to output generated words using a training set comprising target words, the GAN comprising a generator model and a discriminator model, wherein the generator model and the discriminator model are machine-learning models; and deriving the wordlist generator from the trained GAN; and a cybersecurity assessment system configured perform a cybersecurity assessment of a computer system, using the wordlist, wherein the wordlist generator comprises the generator model and the discriminator model of the trained GAN, wherein the generator model is configured to generate the generated word using the wordlist property, wherein the discriminator model is configured to determine that the generated word is to be added to the wordlist, wherein the wordlist generator is configured to add the generated word to the wordlist.

8. The system of claim 7, wherein the cybersecurity assessment system is further configured to determine a security level of the computer system based on the cybersecurity assessment, the system further comprising:

a cybersecurity management system configured to perform a cybersecurity task based on the security level.

9. The system of claim 8, wherein the cybersecurity task comprises one of controlling user and password management related to the computer system, enabling or disabling protocols of the computer system, and applying secure encryption algorithms to the computer system.

10. The system of claim 7, wherein the discriminator model is configured to determine that the generated word is be added to the wordlist by comparing the output of the discriminator model upon processing the generated word to a threshold value.

11. The system of claim 7, wherein the cybersecurity assessment is a penetration test configured to determine a resilience of the computer system to a brute force attack, or a directory enumeration attack.

12. The system of claim 7, wherein the cybersecurity assessment system is configured to:

input a generated word from the wordlist into an input field of a user interface associated with the computer system, the input field configured to allow or deny access to a resource of the computer system; and based on the inputting of the word, determine if the resource is accessible.

13. The system of claim 7, wherein the training set further comprises at least one of:

metadata to describe the target words; and features of the target words.

14. A method of generating a wordlist generator, comprising:

obtaining target words;

generating metadata describing the target words;

generating, based on the target words, features of the target words;

creating a training database comprising the target words, the metadata and the features;

training a generative adversarial network (GAN) to output words using the training database, the GAN comprising a generator model and a discriminator model, wherein the generator model and the discriminator model are machine-learning models; and deriving the wordlist generator from the trained GAN, wherein the wordlist generator comprises the generator model and the discriminator model of the trained GAN.

15. The method of claim 14, wherein the generator model is an autoencoder, wherein a latent space of the generator model is conditioned using the metadata and the features.

16. The method of claim 14, wherein the wordlist generator generates a wordlist conditioned on a wordlist property.

17. The method of claim 16, wherein wordlist the property comprises one or more features of the target words.

* * * * *